United States Patent [19]

Bell et al.

[11] Patent Number: 4,630,162

[45] Date of Patent: Dec. 16, 1986

[54] ESD INPUT PROTECTION CIRCUIT

[75] Inventors: Kenneth M. Bell, Windom; William H. Giolma, Dallas, both of Tex.

[73] Assignee: Texas Instruments Incorporated, Dallas, Tex.

[21] Appl. No.: 636,191

[22] Filed: Jul. 31, 1984

[51] Int. Cl.[4] .............................................. H02H 9/00
[52] U.S. Cl. ........................................ 361/56; 361/91; 361/111
[58] Field of Search ....................... 361/54, 56, 88, 91, 361/111; 307/200 A, 540, 542, 546, 549, 567

[56] References Cited

U.S. PATENT DOCUMENTS

| | | | |
|---|---|---|---|
| 4,037,140 | 7/1977 | Eaton, Jr. ............................... | 361/56 |
| 4,321,644 | 3/1982 | Brasfield .............................. | 361/91 X |
| 4,323,942 | 4/1982 | Hartman et al. .................... | 361/91 X |
| 4,331,884 | 5/1982 | Svedberg ............................. | 361/91 X |
| 4,475,012 | 10/1984 | Coulmance ......................... | 361/91 X |
| 4,527,213 | 7/1985 | Ariizumi ............................. | 361/91 X |

FOREIGN PATENT DOCUMENTS 0055552 7/1982 European Pat. Off. .............. 361/56

Primary Examiner—Peter S. Wong
Assistant Examiner—Marc S. Hoff
Attorney, Agent, or Firm—Richard A. Bachand; N. Rhys Merrett; Melvin Sharp

[57] ABSTRACT

A clamp circuit which breaks down under application of high voltage is connected to an input pin to be protected through a unidirectional device such as a diode. A voltage supply is connected to the discharge path between the unidirectional device and the clamp. The voltage supply will therefore supply any leakage currents which may be drawn by the clamp during normal operation.

11 Claims, 3 Drawing Figures

ESD INPUT PROTECTION CIRCUIT

BACKGROUND AND SUMMARY OF THE INVENTION

The present invention relates to an improved electrostatic discharge input protection circuit for integrated circuits.

Protection from electrostatic discharge (ESD) is a very important feature on most integrated circuits incorporating insulated gate field effect transistors (IGFET). ESD transient voltages of several thousand volts are easily applied to such integrated circuits during normal handling procedures. Without adequate input protection, these voltages are sufficient to break down the thin gate oxides used on the input IGFETs.

Standard ESD input protection circuits often provide a mechanism whereby one or more transistors break down at voltages higher than the normal operating voltages but lower than the break down voltage of the input gate, and shunt the ESD current safely to ground. An example of such a circuit is shown in FIG. 1, where transistors Q1 and Q2 turn on when a high voltage is applied, protecting any devices attached to terminal 14. The arrangement of FIG. 1 can provide ESD protection of up to several thousand volts.

Such a standard input circuit has a serious limitation when used with certain classes of circuits. After an ESD voltage has been drained off, a small leakage current will flow through transistors Q1 and Q2 during normal operation. Such leakage current is usually small, generally being on the order of tens of nanoamps. However, certain classes of integrated circuits, such as CMOS operational amplifiers, are often specified to draw input current of no more than tens of picoamps. The use of a standard input protection circuits on such linear CMOS parts will protect the parts themselves from damage, but the parts will no longer meet rated specifications after an ESD voltage has been shunted to ground. Therefore, such parts are no longer useful as meeting the specifications used by circuit designers.

It is therefore an object of the present invention to provide an improved ESD input protection circuit which can protect the integrated circuit from high ESD voltages, while reducing or eliminating leakage current which may be drawn by the ESD protection circuit through the input pin.

Therefore, according to the present invention, a unidirectional current device is coupled between the input pin and the ESD protection clamp circuit so that current flows only from the input pin to the clamp circuit. At the junction between the unidirectional device and the clamp circuit, a voltage supply, normally connected to the most positive voltage supplied to the integrated circuit chip, is attached. Thus, as long as the voltage on the input pin is lower than the positive voltage supply, all leakage current drawn by the ESD protection circuit will be taken directly from the supply and not from the input pin. Thus, although leakage current is still drawn, no excess current is drawn through the input pin, and the integrated circuit as a whole will continue to meet design specifications for maximum input current.

The novel features which characterize the present invention are defined by the appended claims. The foregoing and other objects and advantages of the present invention will hereafter appear, and for purposes of illustration, but not of limitation, two preferred embodiments are shown in the accompanying drawings.

DESCRIPTION OF THE PREFERRED EMBODIMENTS

Figure 1:
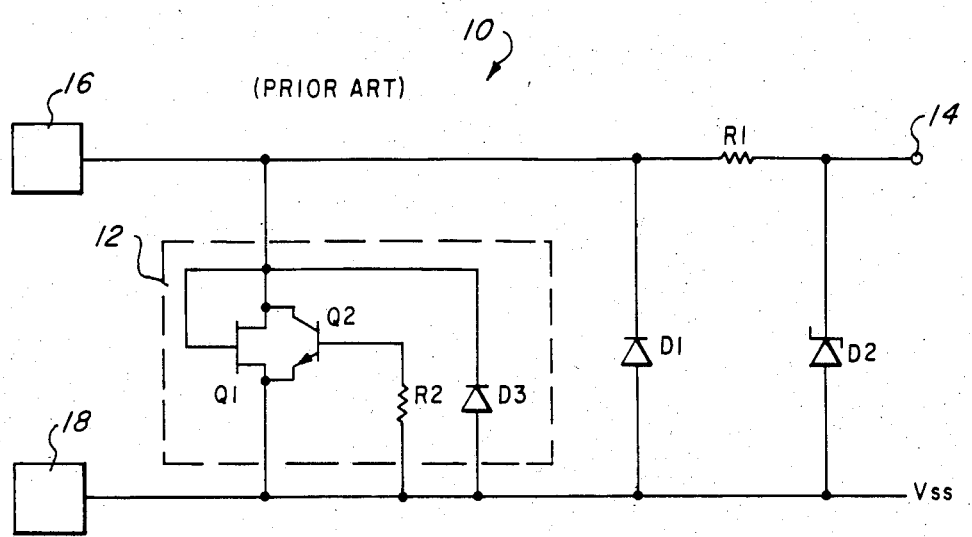
FIG. 1 is a schematic diagram of a prior art ESD input protection circuit.

Referring to FIG. 1, a prior art ESD input protection circuit 10 is shown. This circuit includes a clamp 12 to protect against positive ESD spikes, and diode D1 to protect against negative ESD spikes. The circuit to be protected is attached to node 14, and input pins 16 and 18 are coupled to the input signal and to Vss (usually ground) respectively. Zener diode D2 prevents the voltage at node 14 from rising to a harmful value, and resistor R1 limits current through D2. Clamp circuit 12 is required because the current through R1 will generally not be high enough to drain off ESD spikes before damage occurs to the interior circuitry of the chip.

Clamp 12 includes an FET transistor Q1 and an NPN transistor Q2 in parallel. Diode D3 ensures that the voltage at the collector of Q2 will not drop more than 1 forward diode voltage drop below Vss, and current through R2 biases Q2 in a conducting state once current has begun to flow through Q2.

When a positive ESD voltage is applied to input 16, transistors Q1 and Q2 break down and begin conduction. This generally happens at a voltage which is somewhat above the normal operating range of the device. For example, if the maximum operating voltage is 18–20 volts, Q1 and Q2 are typically designed to break down at approximately 30–40 volts. When such breakdown occurs, both transistors conduct and the voltage drop between pins 16 and 18 drops to a safe voltage. Once the ESD voltage has been discharged, Q1 and Q2 turn off and revert to normal operation.

After the ESD spike has been discharged, the gate of Q1 usually becomes somewhat leaky. These leakage currents may be on the order of tens of nanoamps, which can severely impair the operation of a circuit, such as an operational amplifier, which has maximum input currents specified in the low picoamp range.

Figure 2:
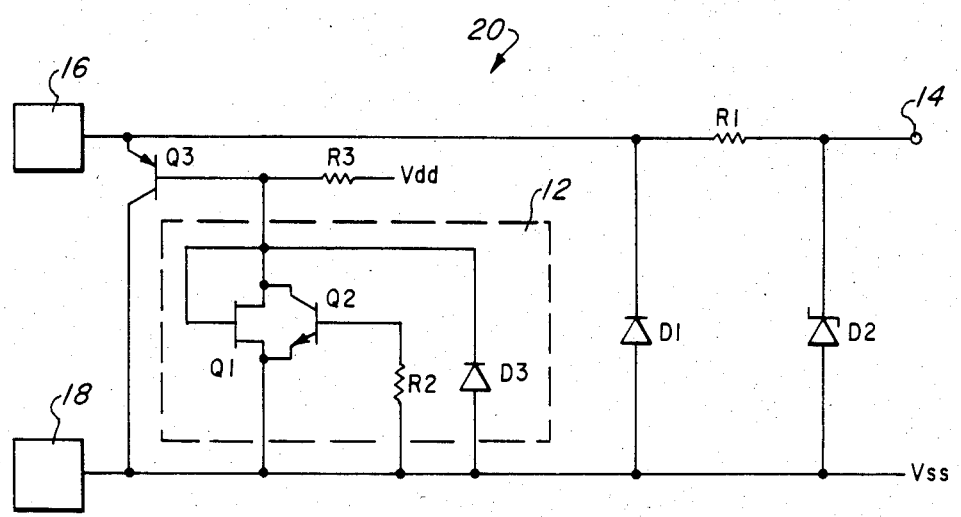
FIG. 2 is a schematic diagram of an ESD input protection circuit according to the present invention.

Therefore, referring to FIG. 2, an improved ESD input protection circuit according to the present invention is shown. PNP transistor Q3 and resistor R3 are added to the circuit of FIG. 1 as shown. R3 is connected between the positive power supply Vdd and the base of Q3. The base of Q3 is also connected to the clamp circuit 12 as shown. The emitter of Q3 is connected to the input pin 16 and the collector is connected to device ground Vss. This additional circuitry operates so that any leakage current drawn by the clamp circuit 12 will be supplied by the positive supply Vdd through R3 instead of the input pin 16 when the input voltage at pin 16 is less than Vdd.

If the input voltage at pin 16 rises above Vdd, such as from the application of an ESD voltage, Q3 begins conducting to device ground Vss. As the voltage continues to rise, the clamp 12 turns on as described in connection with FIG. 1, causing a low impedance path between pins 16 and 18 which discharges the electrostatic voltage. Resistor R3 limits the amount of current which flows from Vdd to Vss when the clamp 12 turns on. Once the electrostatic voltage has been discharged, clamp 12 turns off as described before, as does Q3. Thus, the addition of Q3 and R3 has no adverse affect on the operation of the ESD protection clamp 12, and isolates the input pin 16 from supplying any leakage current which is drawn after the circuit 20 has discharged an electrostatic voltage. To the input pin 16, it appears that no significant leakage current is drawn by the protection circuit 20.

Figure 3:
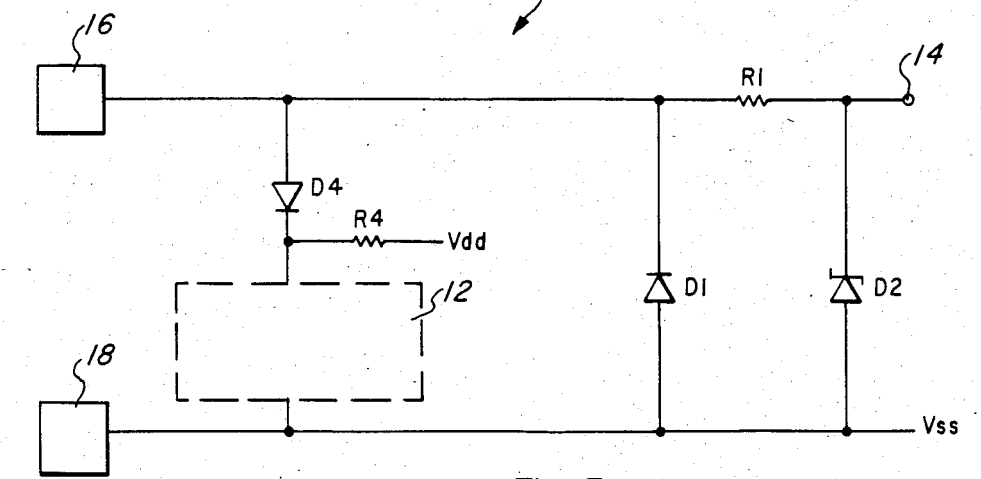
FIG. 3 is a schematic diagram of an alternative embodiment of an ESD protection circuit according to the present invention.

An alternative embodiment of the present invention is shown in FIG. 3. An ESD input protection circuit 22 includes resistor R4 and diode D4 added to the circuit of FIG. 1. If a high voltage is applied to pin 16, clamp 12 turns on as described above. Since clamp 12 will become leaky as described above, diode D4 isolates the input pin 16 from the clamp 12. As long as the voltage on the input pin 16 is less than the positive supply voltage Vdd, any leakage current drawn by the clamp 12 will be supplied by the positive supply. Resistor R4 limits the current drawn from the supply voltage while the clamp 12 is shorted to ground to absorb an electrostatic discharge. Any suitable clamp circuit 12 may be used with protection circuits 20 or 22; clamp 12 is not limited to the design shown in FIGS. 1 and 2.

It is thus seen that the present invention allows a major improvement to be made in ESD input protection circuitry with only minor modifications to existing circuits. The circuit of the present invention is simple, reliable and inexpensively retrofitted to existing input protection devices. It allows IGFET devices with extremely low input current specifications to meet those specifications after application of an ESD voltage.

While two preferred embodiments have been described above, it will become apparent to those skilled in the art that various modifications may be made to these embodiments. Such modifications fall within the scope of the present invention, which is defined by the appended claims.

We claim:

1. An electrostatic discharge protection circuit for an integrated circuit input, the integrated circuit being driven by a supply voltage source, comprising:
   clamp means for providing a current path to a predetermined reference voltage when the voltage at the input exceeds a preselected value; and
   switch means responsive to and controlled by said supply voltage source for providing a current path from the input to said clamp means when the input voltage exceeds
   the voltage of said supply voltage source.

2. The circuit of claim 1, wherein said switch means comprises:
   said supply means coupled to said clamp means for providing leakage current to said clamp means when the input voltage is less than said supply voltage; and
   blocking means coupled to said clamp means and to said supply voltage source for preventing current flow from said supply means to the input when the input voltage is less than the supply voltage.

3. The circuit of claim 2, wherein said supply means comprises a resistor coupled to the supply voltage source.

4. The circuit of claim 2, wherein said blocking means comprises a diode.

5. An electrostatic discharge protection circuit for an integrated circuit input, comprising:
   clamp means for providing a current path to a first reference voltage when the voltage at the input exceeds a preselected value; and
   switch means for providing a current path from the input to said clamp means when the input voltage exceeds a second preselected value,
   wherein said switch means comprises supply means coupled to said clamp means for providing leakage current to said clamp means when the input voltage is less than a second reference voltage; and
   blocking means coupled to said clamp means and to said supply means for preventing current flow from said supply means to the input when the input voltage is less than the second reference voltage,
   wherein said blocking means comprises a transistor having a collector coupled to the first reference voltage, an emitter coupled to the input, and a base coupled to said supply means.

6. An electrostatic discharge protection circuit for an integrated circuit input, comprising:
   first unidirectional means coupled to the input and to a reference voltage source for conducting current when the input voltage drops below the voltage of said reference voltage source;
   clamp means for providing a low impedance path to the reference voltage source when the voltage at the input exceeds a preselected amount greater than the voltage at said reference voltage source;
   voltage supply means for supplying leakage current to the clamp means; and
   second unidirectional means responsive to and controlled by said supply means and coupled to the input and to the clamp means for carrying current only when the input voltage exceeds
   the voltage of said voltage supply means.

7. The circuit of claim 6, wherein said first unidirectional means comprises a diode.

8. An electrostatic discharge protection circuit for an integrated circuit input, comprising:
   first unidirectional means coupled to the input and to a first reference voltage for conducting current when the input voltage drops below the first reference voltage;
   clamp means for providing a low impedance path to the first reference voltage when the voltage at the input exceeds a preselected amount greater than the first reference voltage;
   supply means for supplying leakage current to the clamp means; and
   second unidirectional means coupled to the input and to the clamp means for carrying current only when the input voltage exceeds a second reference voltage;
   wherein the second unidirectional means comprises a transistor having a base coupled to said clamp means, an emitter coupled to the input, and a collector coupled to the second reference voltage.

9. The circuit of claim 6, wherein the first reference voltage is the circuit ground, and the second reference voltage is the positive supply.

10. An electrostatic discharge protection circuit for an integrated circuit input, comprising:
    first unidirectional means coupled to the input and to a first reference voltage for conducting current when the input voltage drops below the first reference voltage;

clamp means for providing a low impedance path to the first reference voltage when the voltage at the input exceeds a preselected amount greater than the first reference voltage;

supply means for supplying leakage current to the clamp means; and second unidirectional means coupled to the input and to the clamp means for carrying current only when the input voltage exceeds a second reference voltage;

wherein the second unidirectional means comprises a diode having its anode coupled to the input and its cathode coupled to said clamp means and wherein said clamp means comprises a field effect transistor in parallel with a bipolar junction transistor.

11. An electrostatic discharge protection circuit for an integrated circuit input, comprising:

first unidirectional means coupled to the input and to a first reference voltage for conducting current when the input voltage drops below the first reference voltage;

clamp means for providing a low impedance path to the first reference voltage when the voltage at the input exceeds a preselected amount greater than the first reference voltage;

supply means for supplying leakage current to the clamp means; and second unidirectional means coupled to the input and to the clamp means for carrying current only when the input voltage exceeds a second reference voltage;

wherein the second unidirectional means comprises a transistor having a base coupled to said clamp means, an emitter coupled to the input, and a collector coupled to the second reference voltage; and wherein said clamp means comprises a field effect transistor in parallel with a bipolar junction transistor.

* * * * *